US012531320B2

(12) United States Patent
Ge et al.

(10) Patent No.: US 12,531,320 B2
(45) Date of Patent: Jan. 20, 2026

(54) CAVITY FILTER

(71) Applicant: Suzhou Luxshare Technology Co., Ltd., Suzhou (CN)

(72) Inventors: Wen Ge, Suzhou (CN); XingHua Sun, Suzhou (CN); ShaoDong Li, Suzhou (CN); Ye Wang, Suzhou (CN)

(73) Assignee: Suzhou Luxshare Technology Co., Ltd., Suzhou (CN)

( * ) Notice: Subject to any disclaimer, the term of this patent is extended or adjusted under 35 U.S.C. 154(b) by 151 days.

(21) Appl. No.: 18/223,398

(22) Filed: Jul. 18, 2023

(65) Prior Publication Data

US 2024/0021968 A1 Jan. 18, 2024

(30) Foreign Application Priority Data

Jul. 18, 2022 (CN) ......................... 202210840530.1

(51) Int. Cl.
*H01P 1/207* (2006.01)
*H01P 1/205* (2006.01)

(52) U.S. Cl.
CPC .............. *H01P 1/205* (2013.01); *H01P 1/207* (2013.01)

(58) Field of Classification Search
CPC ...... H01P 1/203; H01P 1/207; H01P 1/20327; H01P 1/20354; H01P 1/20381; H01P 1/208; H01P 1/205; H01P 1/201; H01P 1/20; H01P 7/08; H01P 7/084
See application file for complete search history.

(56) References Cited

U.S. PATENT DOCUMENTS

| | | | |
|---|---|---|---|
| 5,877,123 | A | 3/1999 | Das |
| 2004/0129958 | A1 | 7/2004 | Koh et al. |
| 2021/0344091 | A1 | 11/2021 | Deng et al. |

FOREIGN PATENT DOCUMENTS

| | | | |
|---|---|---|---|
| CN | 202550043 | U | 11/2012 |
| CN | 207883884 | U | 9/2018 |
| CN | 214477829 | U | 10/2021 |
| CN | 215342908 | U | 12/2021 |
| CN | 216624526 | U | 5/2022 |

(Continued)

OTHER PUBLICATIONS

Chinese Office Action and Search Report for Chinese Application No. 202210840530.1, dated Apr. 11, 2025, with English translation.

(Continued)

*Primary Examiner* — Stephen E. Jones
(74) *Attorney, Agent, or Firm* — Birch, Stewart, Kolasch & Birch, LLP

(57) ABSTRACT

A cavity filter includes a housing, an input resonator and an output resonator. The input resonator includes a first sheet-like resonant body, an input end extending outward from one side of the first sheet-like resonance body and a first branch extending outward from the first sheet-like resonance body and/or the input end, and the input end extends out of the housing through the input through hole. The output resonator includes a second sheet-like resonant body, an output end extending outward from one side of the second sheet-like resonance body, and a second branch extending outward from the second sheet-like resonance body and/or the output end, and the output end extends out of the housing through the output through hole. The lengths of the first branch and the second branch are both a quarter wavelength of a resonant frequency of the cavity filter.

13 Claims, 15 Drawing Sheets

(56) References Cited

FOREIGN PATENT DOCUMENTS

| | | | |
|---|---|---|---|
| CN | 113113743 | B | 6/2022 |
| CN | 217485686 | U | 9/2022 |

OTHER PUBLICATIONS

Yu Tingting, "Application Research on Filter with Out-of-Band Suppression," Thesis Submitted to Nanjing University of Posts and Telecommunications for the Degree of Master of Engeneering, Apr. 2020, 66 pages total, with English translation.

200

220

300

370

CAVITY FILTER

CROSS-REFERENCE TO RELATED APPLICATION

This application claims the priority benefit of Chinese Patent Application Serial Number 202210840530.1, filed on Jul. 18, 2022, the full disclosure of which is incorporated herein by reference.

BACKGROUND

Technical Field

The present disclosure relates to the technical field of filters, in particular to cavity filters.

Related Art

The cavity filter that is used to select the communication signal frequency and filter out the clutter or the interference signal outside the communication signal frequency usually comprises a cavity, a resonant rod, a cover plate and a tuning screw. The cover plate and the cavity form a resonant cavity. The resonant rod is arranged at the bottom of the cavity and has a cylindrical shape. The cover plate cooperates with the tuning screw to adjust the coupling frequency of the cavity filter.

Since the cavity filter will generate harmonics at the integer multiples of the fundamental frequency, the harmonic suppression of the cavity filter has always been concerned by those skilled in the art. Existing cavity filters generally use cascaded low-pass filters (such as candied haws low-pass filters, sheet low-pass filters) to suppress the remote harmonics of the filter. However, the cavity filter that suppresses the remote harmonics by adding an additional low-pass filter has the following disadvantages. (1) The cavity material increases, the assembly is complicated and the cost is high. (2) The low-pass filter needs to occupy the space of the cavity filter such that the performance of the cavity filter is unable to achieve the optimal goal. (3) The addition of an additional low-pass filter causes the insertion loss of the cavity filter to increase. (4) The cavity filter cannot be designed to be smaller and lighter.

Therefore it is desirous those skilled in the art to provide a solution to solve the above-mentioned technical problems.

SUMMARY

The embodiment of the present disclosure provides a cavity filter to solve the existing problems of high cost, low performance, large insertion loss and the problems of light weight and miniaturization due to addition of low-pass filter to the existing cavity filter to suppress remote harmonics.

In one embodiment, a cavity filter comprises a housing, an input resonator and an output resonator. The housing is provided with an accommodating cavity, an input through hole and an output through hole, the input through hole and the output through hole communicating with the accommodating cavity. The input resonator and the output resonator is located in the accommodating cavity and disposed on the housing. The input resonator comprises a first sheet-like resonant body, an input end and a first branch, the input end extending outward from one side of the first sheet-like resonance body, the first branch extending outward from the same side of the input end on the first sheet-shaped resonant body and/or the first branch extending outward from the input end, the input end extending out of the housing through the input through hole. The output resonator comprises a second sheet-like resonant body, an output end and a second branch, the output end extending outward from one side of the second sheet-like resonance body, the second branch extending outward from the same side of the output end on the second sheet-shaped resonant body and/or the second branch extending outward from the output end, the output end extending out of the housing through the output through hole. The length of the first branch and the length of the second branch are a quarter wavelength of a resonant frequency of the cavity filter.

In summary, through the configuration of the first branch of the input resonator and the second branch of the output resonator, and the length of the first branch and the second branch are a quarter wavelength of the resonant frequency of the cavity filter, the cavity filter 300 has the function of suppressing remote harmonics. The cavity filter has a simple structure and does not use a low-pass filter, so that the material cost is reduced, the manufacturing process is simple, the cost is low, and the performance stability and consistency are good. Therefore, it can meet the needs of miniaturization and light weight.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Figure 1:
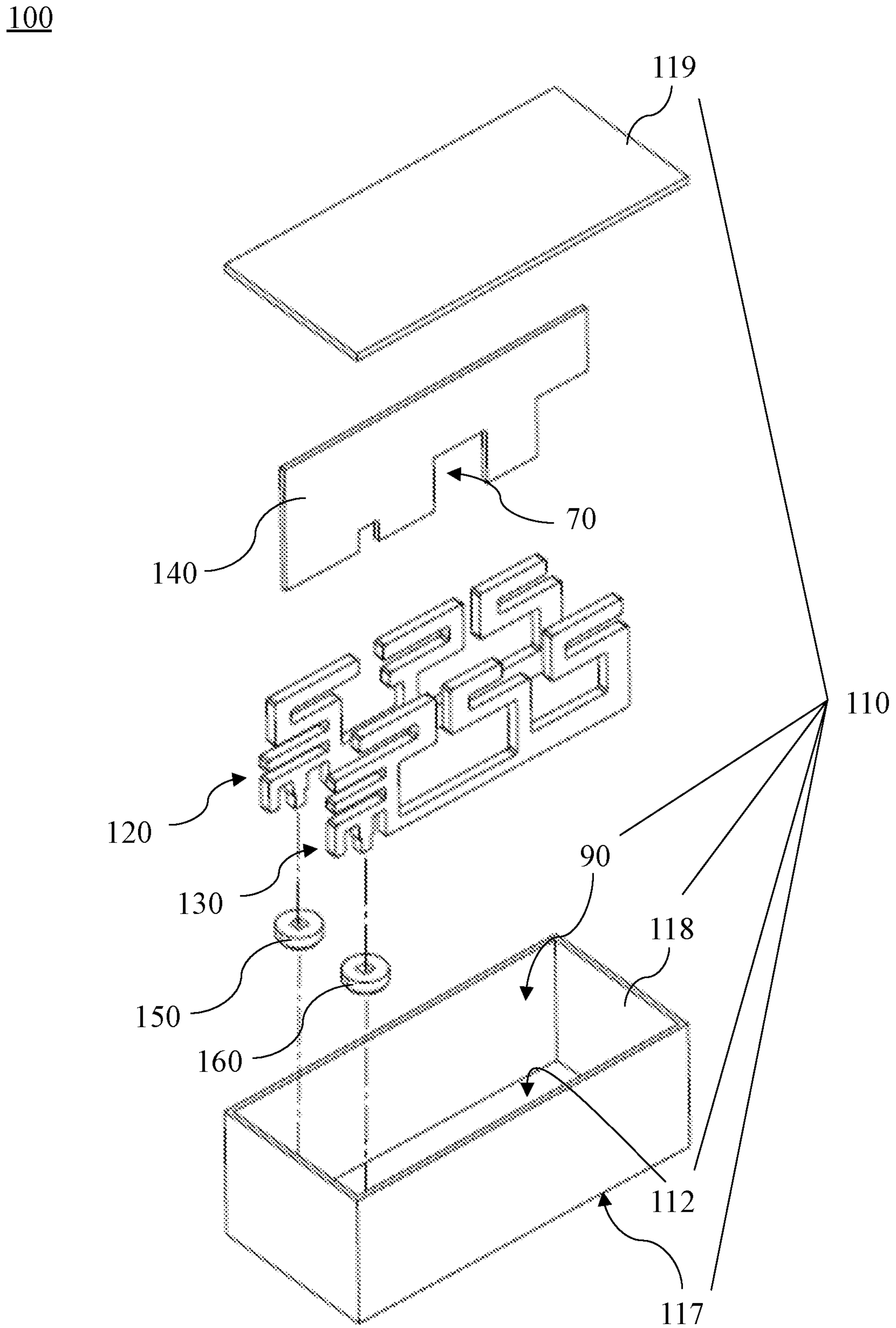
FIG. 1 is an exploded view of the first embodiment of the cavity filter of the present disclosure.
Figure 2:
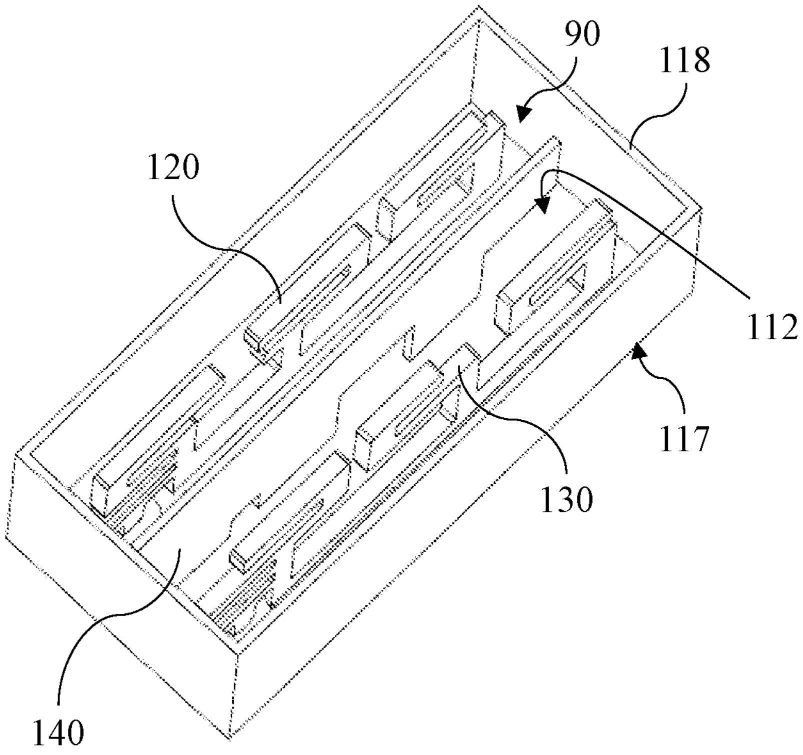
FIG. 2 is the combination diagram of the cavity filter of FIG. 1.
Figure 3:
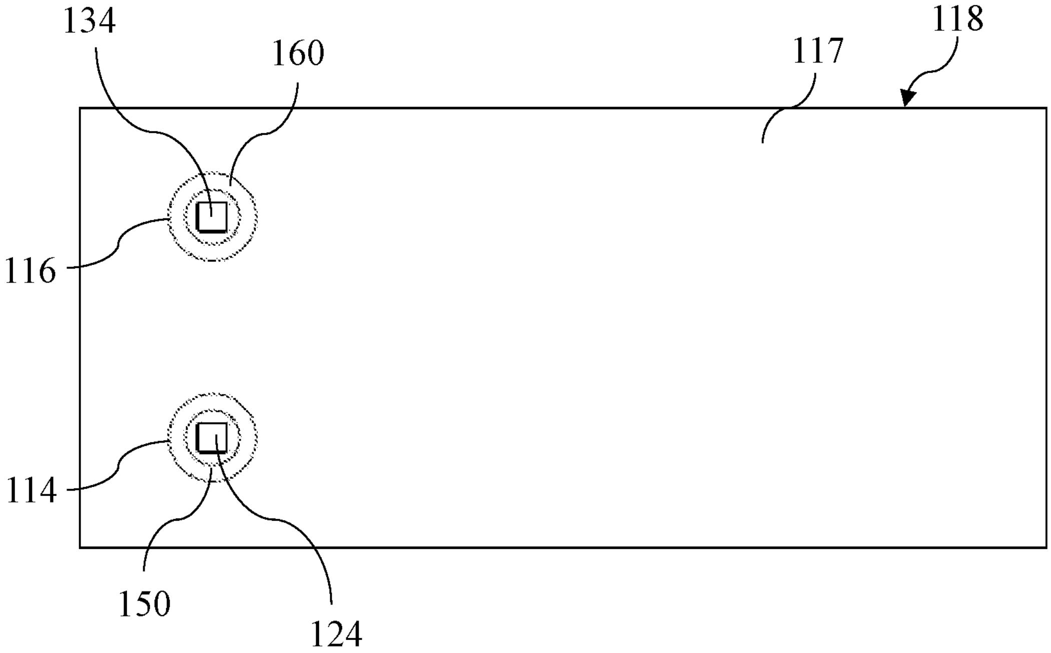
FIG. 3 is the bottom view of the cavity filter of FIG. 1.

Refer FIG. 1 to FIG. 3. FIG. 1 is an exploded view of the first embodiment of the cavity filter of the present disclosure. FIG. 2 is the combination diagram of the cavity filter of FIG. 1. FIG. 3 is the bottom view of the cavity filter of FIG. 1. As shown in FIG. 1 to FIG. 3, the cavity filter 100 includes a housing 110, an input resonator 120 and an output resonator 130. The housing 110 further comprises a bottom plate, a side wall and a cover plate 119. It should be noted that, in order to present the internal combination of the housing 110 of the cavity filter 100, the cover portion 119 of the housing 110 is omitted in FIG. 2.

The housing 110 has an accommodating cavity 112 and is provided with an input through hole 114 and an output through hole 116 communicating with the accommodating cavity 112. The input resonator 120 and the output resonator 130 are located in the accommodating cavity 112 and disposed in the housing 110. Specifically, the side wall 118 is circumferentially connected to the bottom plate 117. The side wall 118 and the bottom plate 117 form the accommodating cavity 112 and the opening 90. One side of the cover plate 119 covers and is fixed to the opening 90. The input resonator 120 and the output resonator 130 are disposed on the bottom plate 117. The input through hole 114 and the output through hole 116 are disposed on the bottom plate 117.

Figure 4:
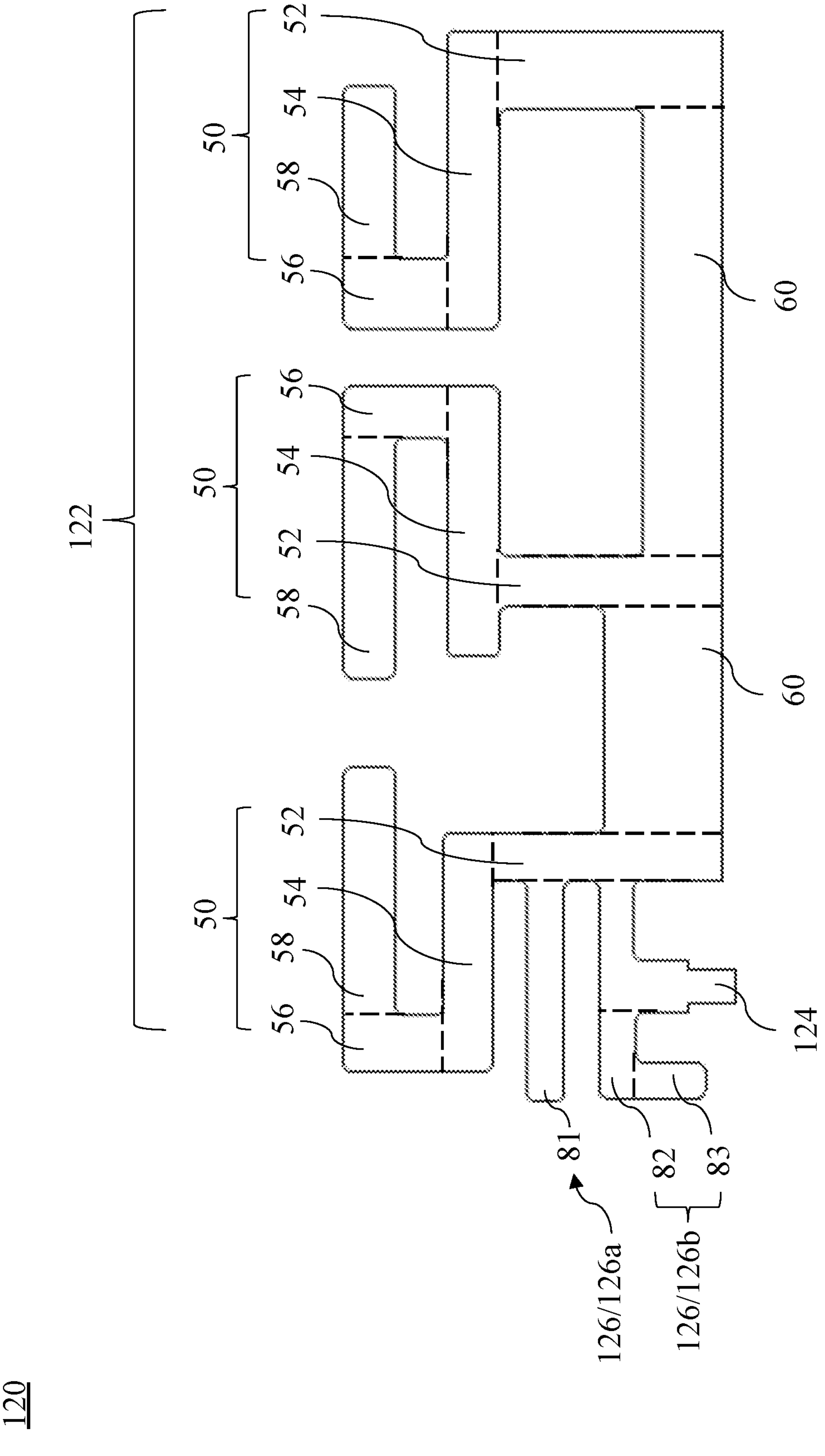
FIG. 4 is the schematic diagram of the structure of the input resonator of FIG. 1.
Figure 5:
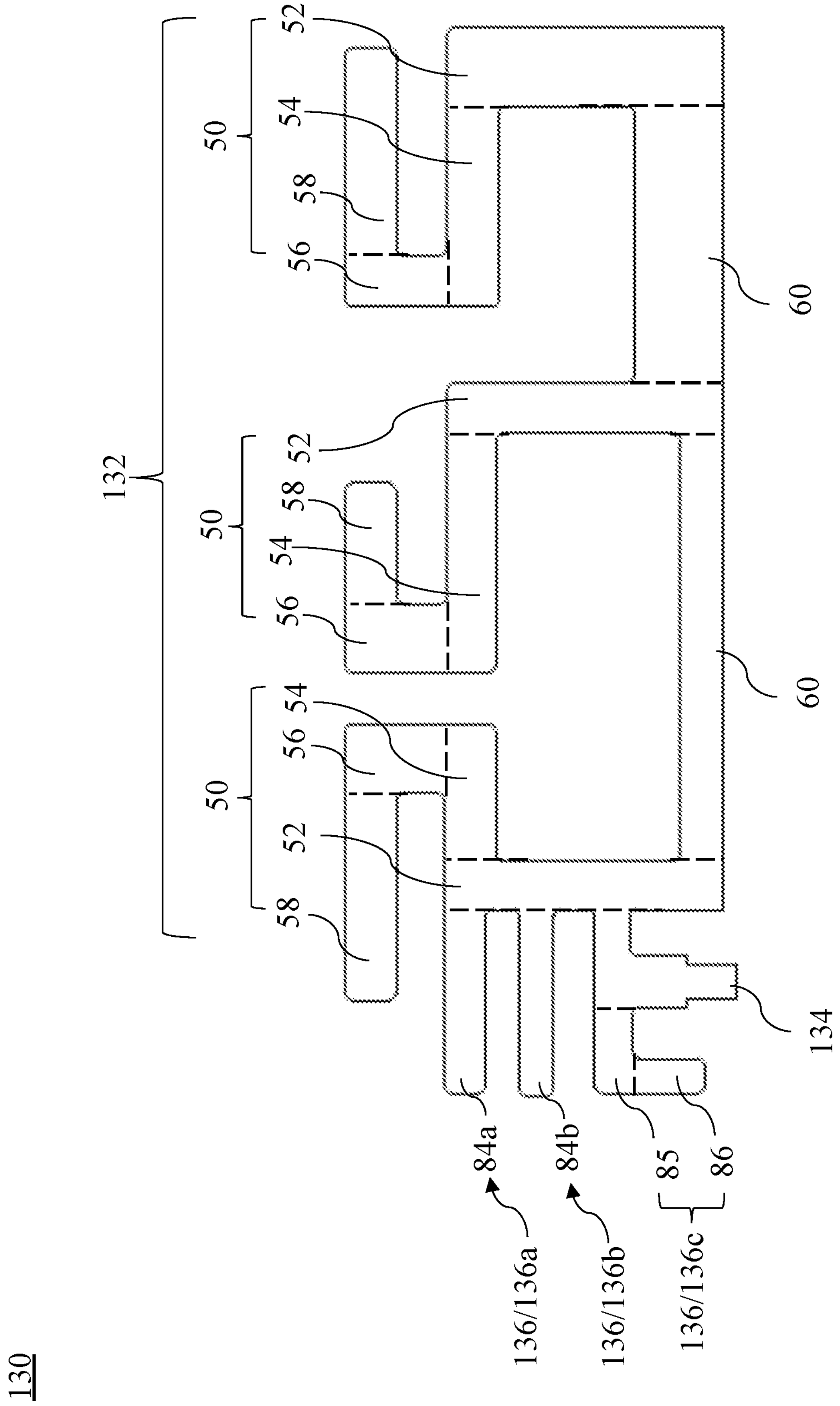
FIG. 5 is the schematic diagram of the structure of the output resonator of FIG. 1.

Refer FIG. 1 to FIG. 5. FIG. 4 is the schematic diagram of the structure of the input resonator of FIG. 1. FIG. 5 is the schematic diagram of the structure of the output resonator of FIG. 1. In this embodiment, the input resonator 120 includes a first sheet-like resonant body 122, an input end 124 and a first branch 126. The input end 124 extends outward from one side of the first sheet-shaped resonant body 122. The first branch 126 extends outward from the same side of the input end 124 on the first sheet-shaped resonant body 122 and/or the first branch 126 extends outward from the input end 124. That is, the input end 124 and the first branch 126 are connected to each other or spaced apart from each other. The input end 124 extends out of the housing 110 through the input through hole 114. The output resonator 130 includes a second sheet-like resonant body 132, an output end 134 and a second branch 136. The output end 134 extends outward from one side of the second sheet-shaped resonant body 132. The second branch 136 extends outward from the same side of the output end 134 on the second sheet-shaped resonant body 132 and/or the second branch 136 extends outward from the output end 134. That is, the output end 134 and the second branch 136 are connected to each other or spaced apart from each other. The output end 134 extends out of the casing 110 through the output through hole 116.

Therefore, the cavity filter 100 can extend out of the housing 110 through the input through-hole 114 through the input end 124 of the input resonator 120 and the output end 134 of the output resonator 130 through the output through-hole 116 to realize the simple structure for the filter port. Moreover, since the input through hole 114 and the output through hole 116 are disposed on the bottom plate 117 of the housing 110, the input end 124 and the output end 134 can be directly bonded to an external circuit board.

In this embodiment, the lengths of the first branch 126 and the second branch 136 are both a quarter wavelength of the resonant frequency of the cavity filter 100. The first branch 126 extends outward from one side of the first sheet-like resonant body 122 and/or the first branch 126 extends outward from the input end 124. That is, the first branch 126 is integrally formed with the first sheet-like resonant body 122. The second branch 136 extends outward from one side of the second sheet-shaped resonant body 132 and/or the second branch 136 extends outward from the output end 134. That is, the second branch 136 is integrally formed with the second sheet-like resonant body 132. The lengths of the first branch 126 and the second branch 136 are both a quarter wavelength of the resonant frequency of the cavity filter 100. Therefore, the cavity filter 100 has the function of suppressing remote harmonics.

In this embodiment, after the external electrical signal enters the cavity filter 100, the electrical signal is transmitted from the input end 124 of the input resonator 120 to the output end 134 of the output resonator 130. Specifically, after the external electrical signal enters the cavity filter 100 from the input end 124, the electrical signal first passes through the first branch 126 of the input resonator 120, then passes through the first sheet-like resonant body 122, and then transmits to the plate-shaped resonant body 132 through coupling, then reaches to the second branch 136, and finally is outputted from the output end 134 of the output resonator 130. Since the first branch 126 and the second branch 136 can generate resonance peaks, the cavity filter 100 can suppress the remote harmonics.

The quantity of the first branch 126 can be multiple, and the quantity of the second branch 136 can be multiple. It should be noted that the more the number of the first branch 126 and the second branch 136 is, the better the harmonic suppression effect of the cavity filter 100 is. The actual number of the first branch 126 and the second branch 136 can be adjusted according to the space size (that is, the space size of the accommodating cavity 112) of the cavity filter 100. In this embodiment, the number of the first branch 126 may be two, that is, the first branch **126*a* and the first branch 126*b*. The number of the second branch 136 can be three, that is, the second branch 136*a*, the second branch 136*b* and the second branch 136*c*. The first branch 126*a*, the first branch 126*b*, the second branch 136*a*, the second branch 136*b* and the second branch 136*c* generate five resonance peaks to depress the remote harmonics of the cavity filter 100**.

In addition, the shape of the first branch 126 and the second branch 136 can be any shape, but the length of the first branch 126 and the second branch 136 needs to be a quarter wavelength of the resonant frequency of the cavity filter 100 in order to achieve the effect of depressing the remote harmonics of the cavity filter 100.

In this embodiment, the first branch **126*a* includes a first extension section 81 extending outward from one side of the first sheet-shaped resonant body 122 (that is, the first branch 126*a* and the input end 124 are spaced apart from each other). The first branch 126*b* includes a second extension 82 extending outward from the input end 124 and a third extension 83 extending from one end of the second extension 82 away from the input end 124 (that is, the first branch 126*b* and the input end 124 connected to each other). The second branch 136*a* includes a fourth extension section 84*a* extending outward from one side of the second sheet-shaped resonant body 132 (that is, the second branch 136*a* and the output end 134 are spaced apart from each other). The second branch 136*b* includes a fourth extension section 84*b* extending outward from one side of the second sheet-shaped resonant body 132 (that is, the second branch 136*b* and the output end 134 are spaced apart from each other). The second branch 136*c* includes a fifth extension 85 extending outward from the output end 134 and a sixth extension 86 extending from one end of the fifth extension 85 away from the output end 134 (that is, the second branch 136*c* and the output end 134** connected to each other).

The length of the first extension 81, the sum of the lengths of the second extension 82 and the third extension 83, the length of the fourth extension **84*a*, the length of the fourth extension 84*b*, and the sum of the fifth extension 85 and the sixth extension 86 are a quarter wavelength of the resonant frequency of the cavity filter 100**.

In this embodiment, the input resonator 120 and the output resonator 130 are sheets with metal surfaces or metal sheets. Therefore, the cavity filter 100 can realize capacitive coupling without a physical capacitive structure, thereby realizing low-end transmission zero. When the input resonator 120 and the output resonator 130 are metal sheets, they can be directly cut and formed from metal plates; when the input resonator 120 and the output resonator 130 are sheets with metal surfaces, they can be implemented by electroplating after injection molding of plastic materials. The thickness of the input resonator 120 and the output resonator 130 may be, but not limited to, 0.5 mm to 1 mm.

In one embodiment, the first sheet-like resonant body 122 and the second sheet-like resonant body 132 respectively include a plurality of resonant rods 50. Each resonant rod 50 includes an upright section 52 and an extension section 54. The extension section 54 extends outward from one side of the upright section 52. The input end 124 and the output end 134 respectively extend outward from the other side of the upright section 52 of the first sheet-like resonant body 122 and the second side of the second sheet-like resonant body 132 relative to the extension section 54. The first branch 126 extends outward from the upright section 52 of the first sheet-like resonant body 122 or extends outward from the input end 124. The second branch 136 extends outward from the upright section 52 of the second sheet-shaped resonant body 132 or extends outward from the output end 134. In one embodiment, the first extension section 81 of the first branch section **126*a* extends outward from one side of the upright section 52 of the first sheet-shaped resonant body 122; and/or the second extension section 82 of the first branch 126*b* extends outward from the input end 124. In one embodiment, the fourth extension section 84*a* of the second branch 136*a* extends outward from one side of the upright section 52 of the second sheet-shaped resonant body 132; and/or the fifth extension section 85 of the second branch 136*b* Extends outward from the output end 134**.

In one embodiment, the first sheet-like resonant body 122 and the second sheet-like resonant body 132 respectively include a plurality of resonant rods 50 and one or more joint rods 60. The joint rod 60 connects two adjacent resonant rods 50 (that is, one or more joint rods 60 connects two adjacent resonant rods 50 among the plurality of resonant rods 50). The first sheet-like resonant body 122 and the second sheet-like resonant body 132 may include the same or different numbers of resonant rods 50, which can be adjusted according to actual needs. In addition, in the first sheet-like resonant body 122 or the second sheet-like resonant body 132, the plurality of resonant rods 50 may have different or identical shapes, which may be adjusted according to actual needs.

The first sheet-like resonant body 122 and the second sheet-like resonant body 132 respectively include three resonant rods 50 and two joint rods 60. The resonant rods 50 included in the first sheet-like resonant body 122 all have different external structures, and the resonant rods 50 included in the second sheet-shaped resonant body 132 also have different external structures.

It should be noted that each of the resonant rods 50 included in the first sheet-shaped resonant body 122 and the second sheet-shaped resonant body 132 has an upright section 52 as its main body, and extensions extend outward according to the requirements of the resonant frequency. That is, each resonant rod 50 includes an upright section 52 fixed on the housing 110, and each resonant rod 50 can adjust the resonant frequency through different extensions. For example, the resonant rod 50 includes an upright section 52, an extension section 54 extending from one or both sides of the upright section 52, an extension section 56 extending from the extension section 54 in a direction away from the upright section 52, and an extension section 58 extending parallel to the extension section 54 from one end of the extension section 56 away from the extension section 54. One end of the upright segment 52 away from the extension segment 54 is connected to the bottom plate 117 of the housing 110.

In this embodiment, the input resonator 120 includes an input end extending outward from one side of the upright section 52 of the outermost resonant rod 50 (i.e., the leftmost resonant rod 50 in FIG. 4) among the plurality of resonant rods 50, a first branch 126*a*, and a first branch 126*b* extending outward from the input end 124. The output resonator 130 includes an output end 134 extending outward from one side of the upright section 52 of the outermost resonant rod 50 among the plurality of resonant rods 50 (i.e., the leftmost resonant rod 50 in FIG. 5), a second branch 136*a*, a second branch 136*b*, and a second branch 136*c* extending outward from the output end 134. In one embodiment, the extension section 54, the first extension section 81 of the first branch 126*a*, and the second extension section 82 of the first branch 126*b* extend toward the same extension direction. In one embodiment, the extension section 54, the first extension section 81 of the first branch 126*a* and the second extension section 82 of the first branch 126*b* extend beyond the extension section 54 in the extending direction. In one embodiment, the extension section 58, the fourth extension section 84*a* of the second branch section 136*a*, the fourth extension section 84*b* of the second branch section 136*b*, and the fifth extension section 85 of the second branch section 136*c* extend in the same extension direction. In one embodiment, the extension section 58, the fourth extension section 84*a* of the second branch 136*a*, the fourth extension 84*b* of the second branch 136*b*, and the fifth extension 85 of the second branch 136*c* extend beyond the extension section 58 in the extending direction.

In an embodiment, the cavity filter 100 may further include an isolation plate 140. The isolation plate 140 is located in the accommodating cavity 112 and separates the input resonator 120 and the output resonator 130. The isolation plate 140 has at least one notch 70. Therefore, the cavity filter 100 can obtain different resonant frequencies by setting the number and positions of the isolation plates 140 and the notches 70 thereof. The isolation plate 140 can be directly cut and shaped from a metal plate.

In one embodiment, the cavity filter 100 may further include an input device 150 and an output device 160. The input device 150 and the output device 160 connect with the input through hole 114 and the output through hole 116 of the housing 110 respectively. The input device 150 and the output device 160 can be insulating sockets, and can be connected to the input through hole 114 and the output through hole 116 of the housing 110 through mechanical or adhesive means.

Figure 6:
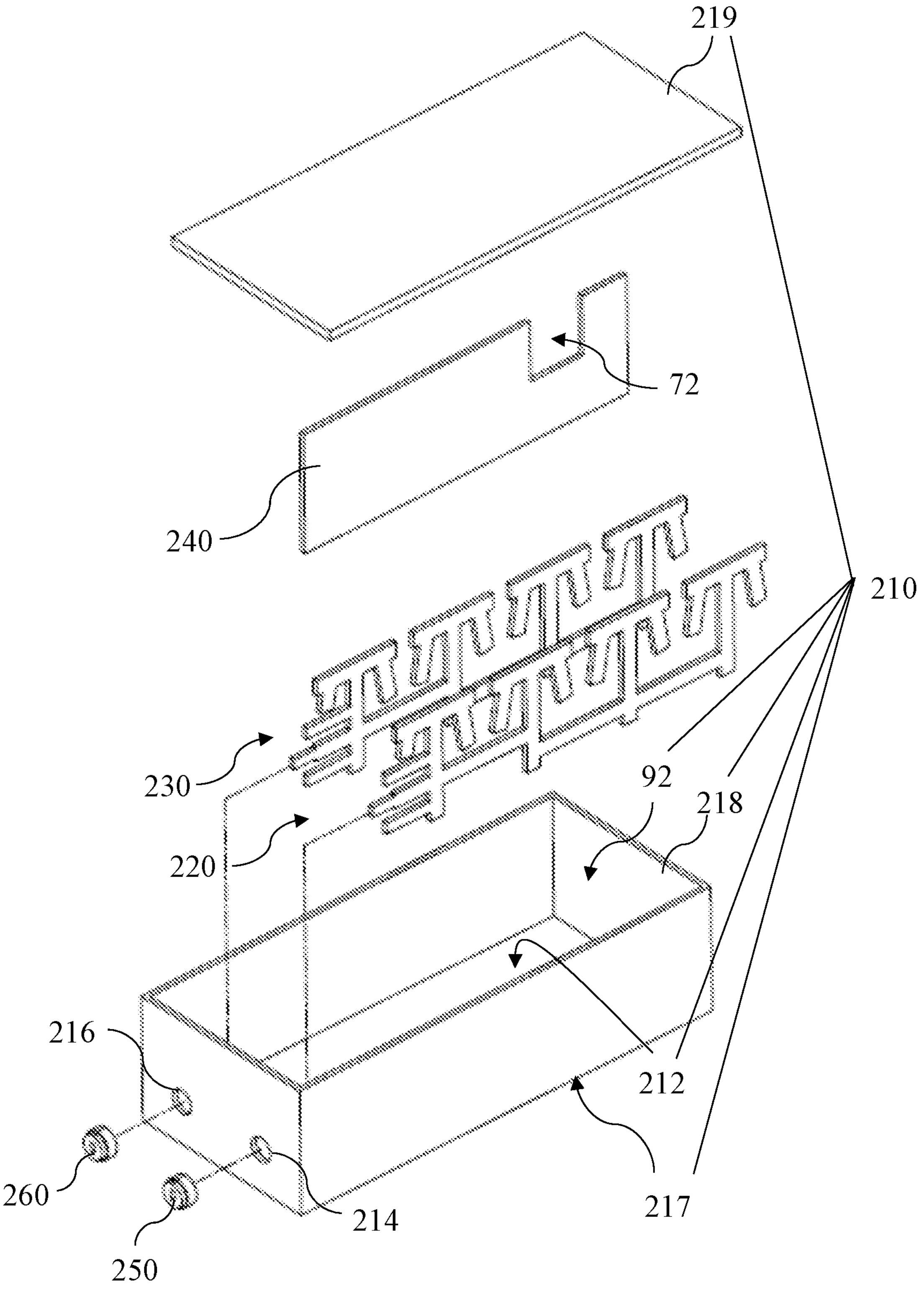
FIG. 6 is an exploded view of the second embodiment of the cavity filter of the present disclosure.
Figure 7:
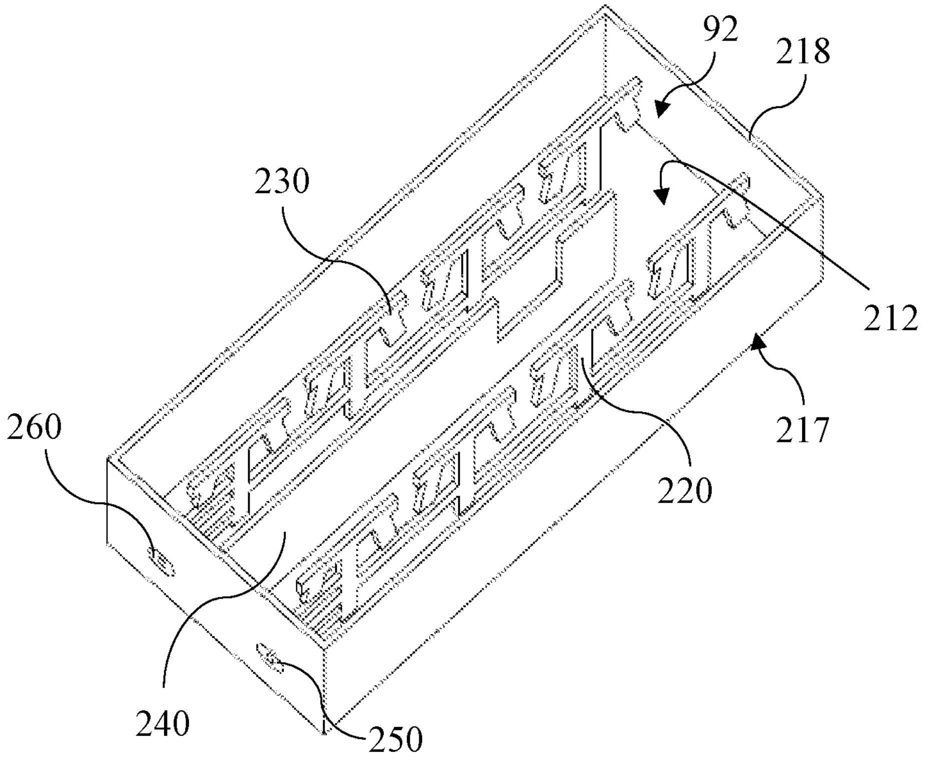
FIG. 7 is the combination diagram of the cavity filter of FIG. 6.
Figure 8:
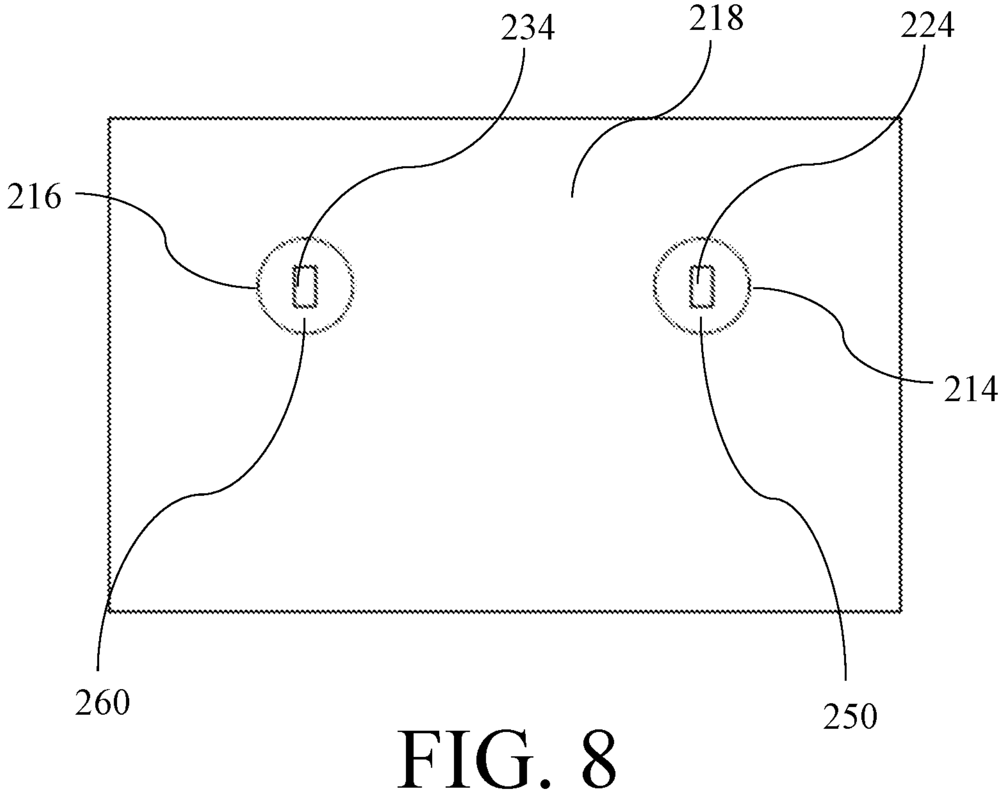
FIG. 8 is the bottom view of the cavity filter of FIG. 6.

Refer to FIG. 6 to FIG. 8. FIG. 6 is an exploded view of the second embodiment of the cavity filter of the present disclosure. FIG. 7 is the combination diagram of the cavity filter of FIG. 6. FIG. 8 is the bottom view of the cavity filter of FIG. 6. As shown in FIG. 6 to FIG. 8, the cavity filter 200 includes a housing 210, an input resonator 220 and an output resonator 230. The housing 210 may include a bottom plate 217, a side wall 218 and a cover plate 219. It should be noted that, in order to present the internal combination of the housing 210 of the cavity filter 200, the cover portion 219 of the housing 210 is omitted in FIG. 7.

The housing 210 has an accommodating cavity 212 and is provided with an input through hole 214 and an output through hole 216 communicating with the accommodating cavity 212. The input resonator 220 and the output resonator 230 are located in the accommodation cavity 212 and disposed on the housing 210. Specifically, the side wall 218 is circumferentially connected to the bottom plate 217. The side wall 218 and the bottom plate 217 form the accommodating cavity 212 and the opening 92. One side of the cover portion 219 covers and is fixed to the opening 92. The input resonator 220 and the output resonator 230 are disposed on the bottom plate 217. The input through hole 214 and the output through hole 216 are disposed on the side wall 218. Therefore, the electrical connection between the cavity filter 200 and the external circuit is located at the side.

Figure 9:
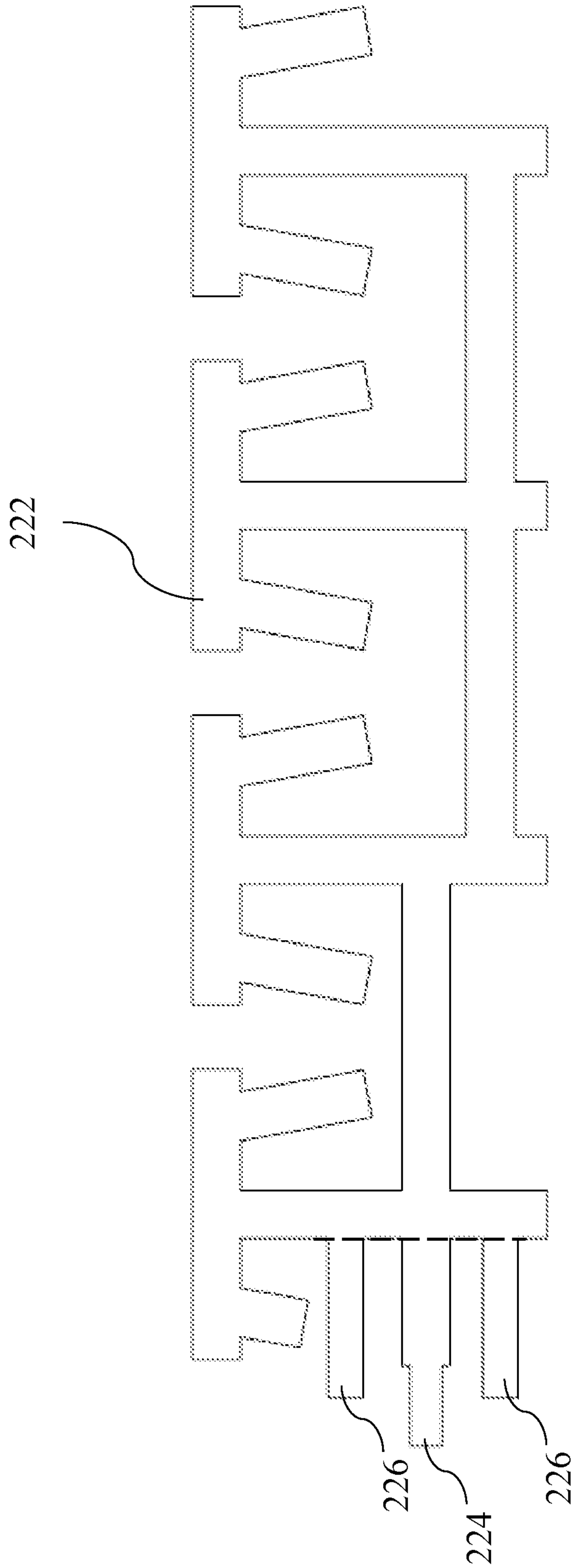
FIG. 9 is the schematic diagram of the structure of the input resonator of FIG. 6.
Figure 10:
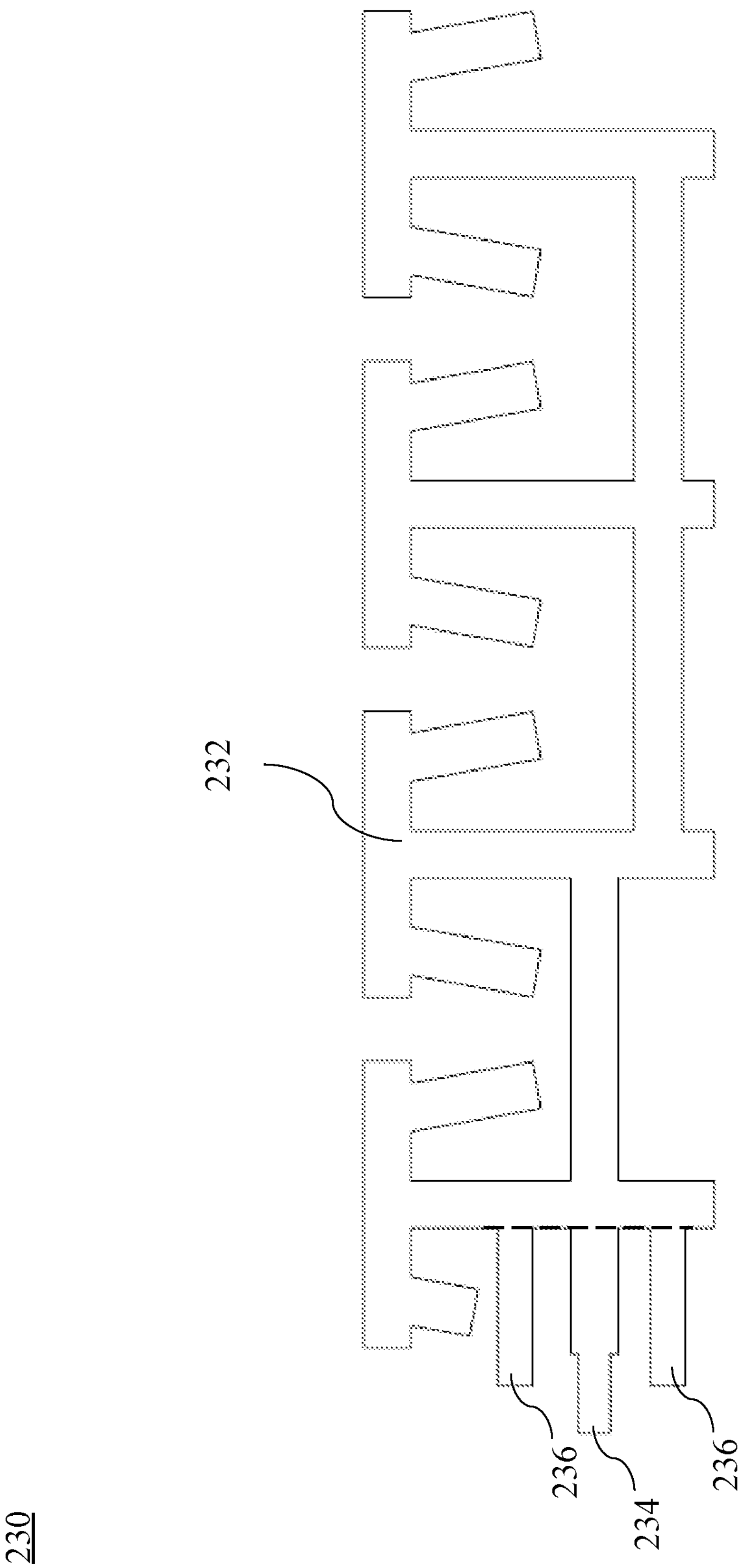
FIG. 10 is the schematic diagram of the structure of the output resonator of FIG. 6.

Refer to FIG. 6 to FIG. 7 and FIG. 9 to FIG. 10. FIG. 9 is the schematic diagram of the structure of the input resonator of FIG. 6. FIG. 10 is the schematic diagram of the structure of the output resonator of FIG. 6. In this embodiment, the input resonator 220 includes a first sheet-shaped resonant body 222 and an input end 224 and a first branch 226 extending outward from one side of the first sheet-shaped resonant body 222. That is, the input end 224 and the first branch 226 are spaced apart from each other. The input end 224 extends out of the housing 210 through the input through hole 214. The output resonator 230 includes a second sheet-shaped resonant body 232 and an output end 234 and a second branch 236 extending outward from one side of the second sheet-shaped resonant body 232. That is, the output end 234 and the second branch 236 are spaced apart from each other. The output end 234 extends out of the casing 210 through the output through hole 216. The lengths of the first branch 226 and the second branch 236 are both a quarter wavelength of the resonant frequency of the cavity filter 200. The cavity filter 200 can protrudes out of the housing 210 through the input port 224 of the input resonator 220 through the input through hole 214 and protrudes out of the housing 210 through the output port 234 of the output resonator 230 the output through hole 216 to realize a simple structure for the filter port. In addition, because the first branch 226 is integrally formed with the first sheet-like resonant body 222, the second branch 236 is integrally formed with the second sheet-like resonant body 232, and the lengths of the first branch 226 and the second branch 236 are both is a quarter wavelength of the resonant frequency of the cavity filter 200, the cavity filter 200 has the function of suppressing remote harmonics.

The shape and structure of the input resonator 220 and the output resonator 230 are consistent, and the shape and structure of the first sheet resonator body 222 and the second sheet resonator body 232 can be designed according to the requirements of the actual resonance frequency.

In an embodiment, the cavity filter 200 may further include an isolation plate 240. The isolation plate 240 is located in the accommodating cavity 212, and separates the input resonator 220 and the output resonator 230. The isolation plate 240 has at least one notch 72.

In one embodiment, the cavity filter 200 may further include an input device 250 and an output device 260. The input device 250 and the output device 260 connects to the input through-hole 214 and the output through-hole 216 of the housing 210, respectively. The input end 224 extends out of the housing 210 after passing through the input device 250, and the output end 234 extends out of the housing 210 after passing through the output device 260

Figure 11:
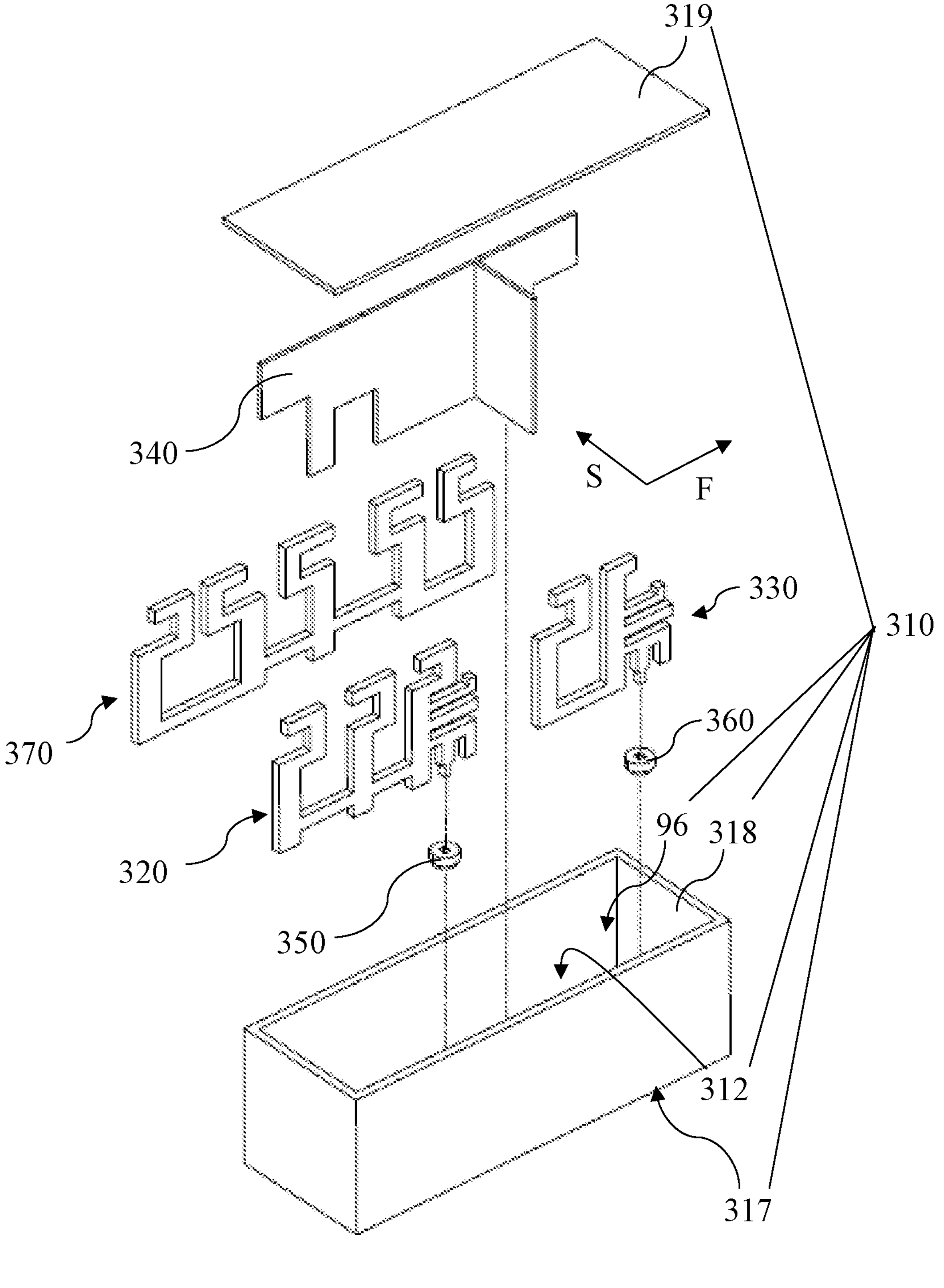
FIG. 11 is an exploded view of the third embodiment of the cavity filter of the present disclosure.
Figure 12:
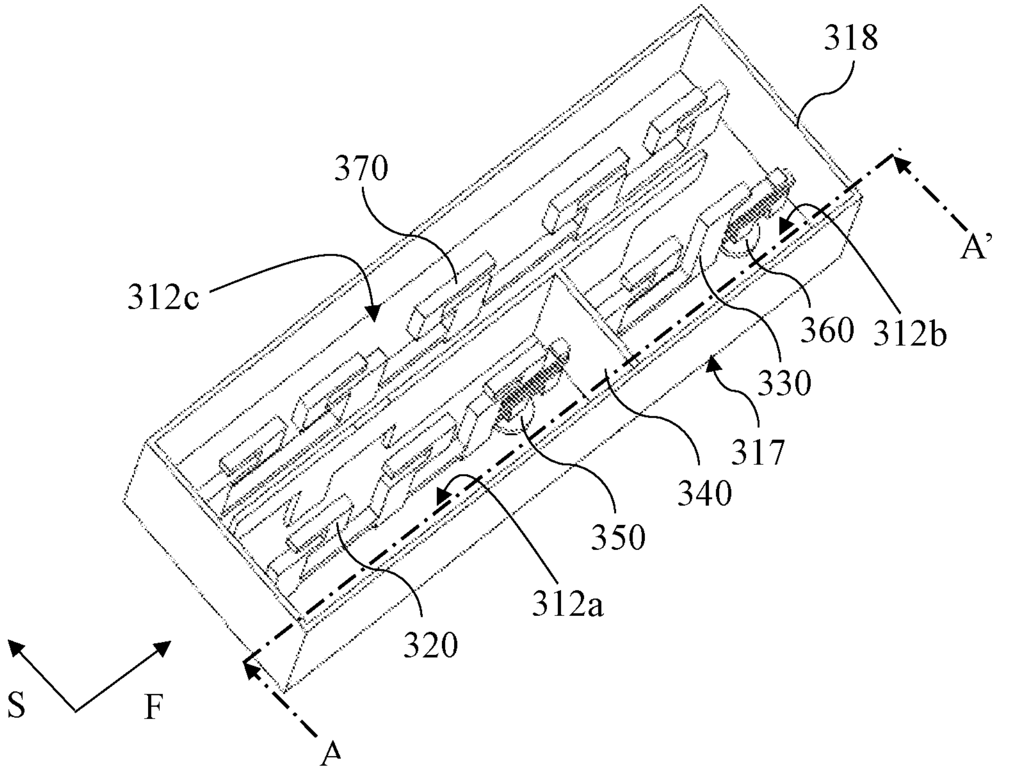
FIG. 12 is the combination diagram of the cavity filter of FIG. 11.
Figure 13:
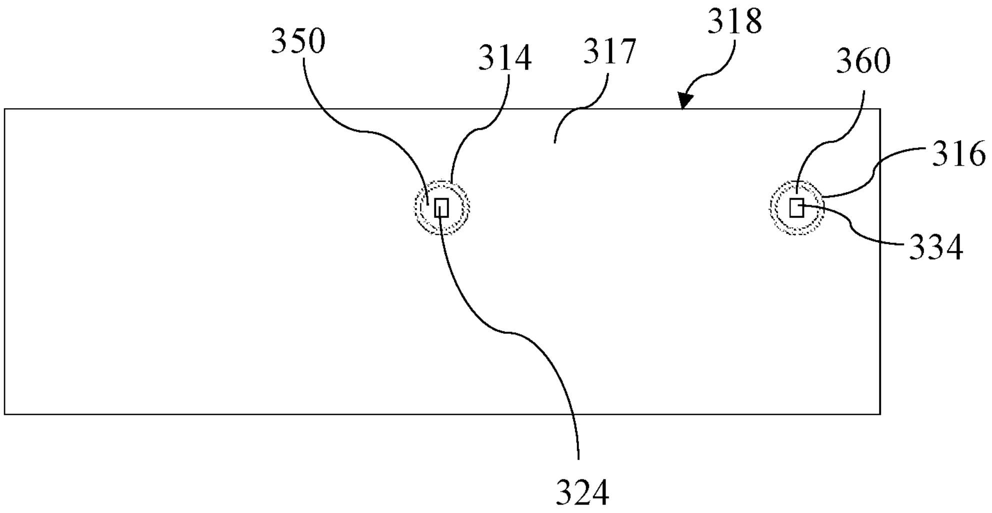
FIG. 13 is the bottom view of the cavity filter of FIG. 11.

Refer to FIG. 11 to FIG. 13. FIG. 11 is an exploded view of the third embodiment of the cavity filter of the present disclosure. FIG. 12 is the combination diagram of the cavity filter of FIG. 11. FIG. 13 is the bottom view of the cavity filter of FIG. 11. As shown in FIG. 11 to FIG. 13, the cavity filter 300 includes a housing 310, an input resonator 320 and an output resonator 330. The housing 310 may include a bottom plate 317, a side wall 318 and a cover plate 319. It should be noted that, in order to present the internal combination of the housing 310 of the cavity filter 300, the cover portion 319 of the housing 310 is omitted in FIG. 12.

The housing 310 has an accommodating cavity 312 and is provided with an input through hole 314 and an output through hole 316 communicating with the accommodating cavity 312. The input resonator 320, the output resonator 330 and the intermediate resonator 370 are located in the accommodating cavity 312 and disposed in the housing 310. Coupling occurs between any two of the input resonator 320, the output resonator 330, and the intermediate resonator 370. Specifically, the side wall 318 is circumferentially connected to the bottom plate 317. The side wall 318 and the bottom plate portion 317 form the accommodating cavity 312 and the opening 96. One side of the cover part 319 covers and is fixed to the opening 96. The input resonator 320, the output resonator 330 and the intermediate resonator 370 are disposed on the bottom plate portion 317. The input through hole 314 and the output through hole 316 are disposed on the bottom plate 317.

Figure 14:
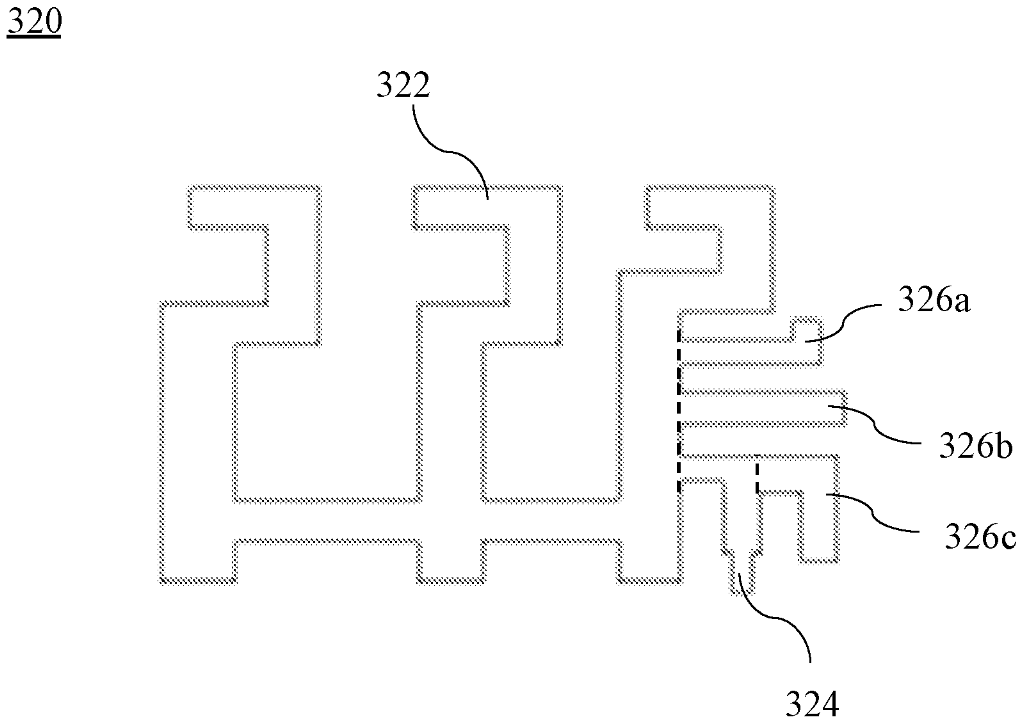
FIG. 14 is the schematic diagram of the structure of the input resonator of FIG. 11.
Figure 15:
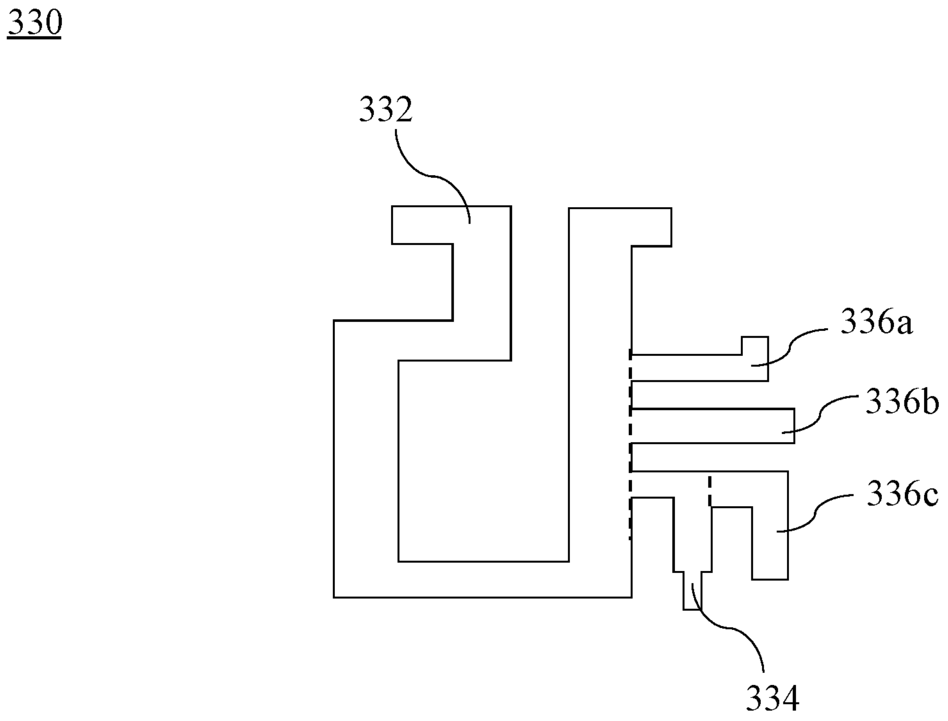
FIG. 15 is the schematic diagram of the structure of the output resonator of FIG. 11.
Figure 16:
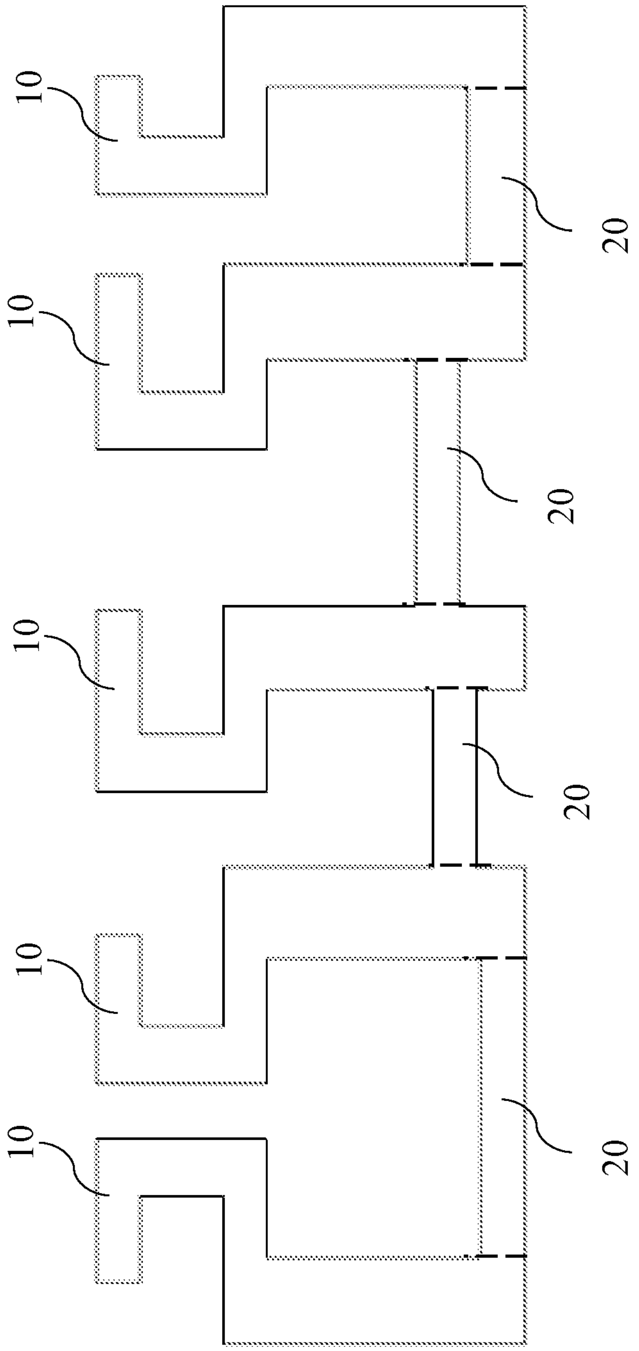
FIG. 16 is the schematic diagram of the structure of the intermediate resonator of FIG. 11.
Figure 17:
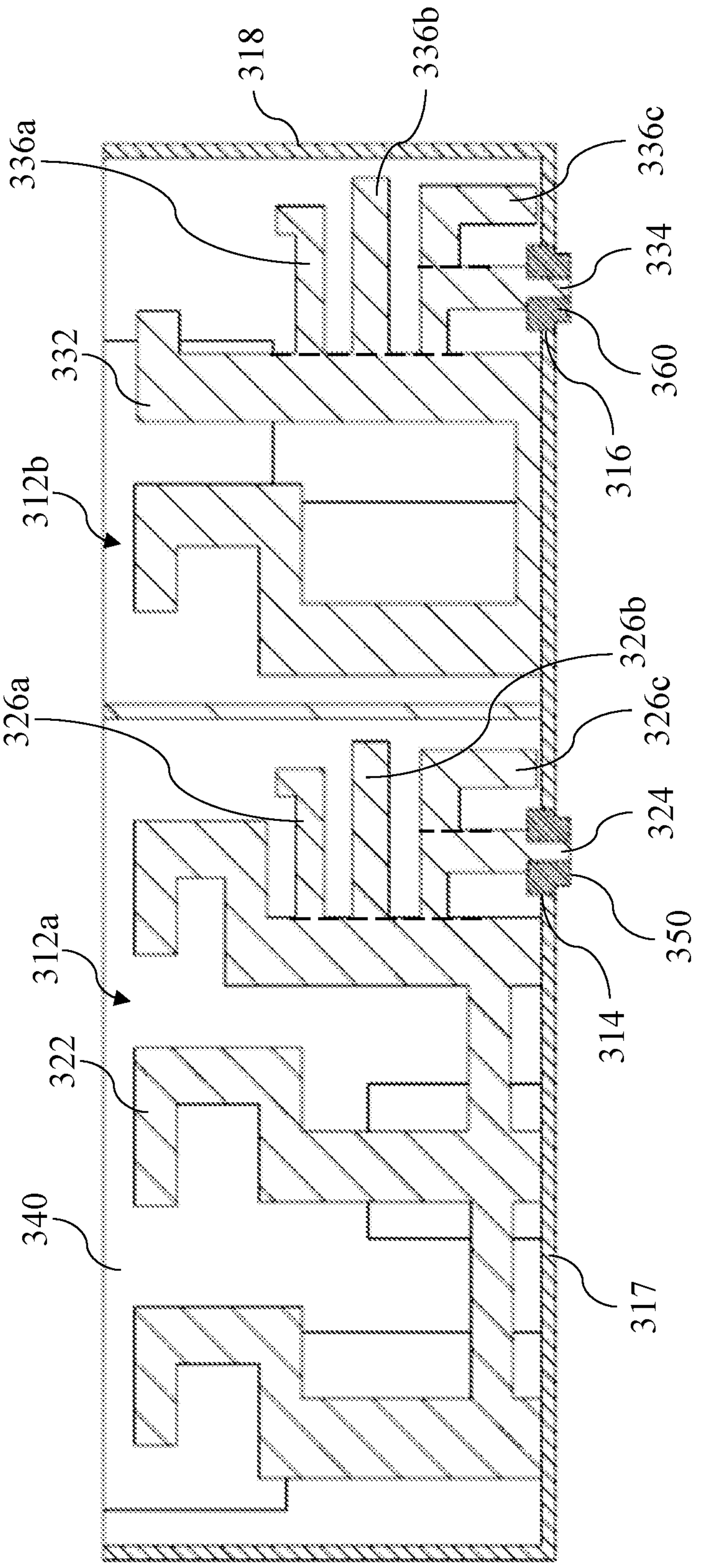
FIG. 17 is a schematic cross-sectional view of FIG. 12 along line AA'.

Refer FIG. 11 to FIG. 17. FIG. 14 is the schematic diagram of the structure of the input resonator of FIG. 11. FIG. 15 is the schematic diagram of the structure of the output resonator of FIG. 11. FIG. 16 is the schematic diagram of the structure of the intermediate resonator of FIG. 11. FIG. 17 is a schematic cross-sectional view of FIG. 12 along line AA'. In this embodiment, the input resonator 320 includes a first sheet-shaped resonant body 322, an input end 324 extending outward from one side of the first sheet-shaped resonant body 322, a first branch **326*a* and a first branch 326*b*, and a first branch 326*c* extending outward from the input end 324. The input end 324 extends out of the housing 310 through the input through hole 314. The output resonator 330 includes a second sheet-like resonant body 332, an output end 334 extending outward from one side of the second sheet-like resonant body 332, a second branch 336*a* and a second branch 336*b*, and a second branch 336*c* extending outward from the output end 334. The output end 334 extends out of the housing 310 through the output through hole 316. The intermediate resonator 370 may include a plurality of resonating rods 10 and one or more joint rods 20. The joint rod 20 connects two adjacent resonant rods 10. The plurality of resonant rods 10 can have different or the same shape and structure, which can be adjusted according to actual needs. The lengths of the first branch 326*a*, the first branch 326*b*, the first branch 326*c*, the second branch 336*a*, the second branch 336*b* and the second branch 336*c* are a quarter wavelength of the resonant frequency of the cavity filter 300**.

Since the first branch **326*a*, the first branch 326*b*, and the first branch 326*c* are integrally formed with the first sheet-like resonant body 322, the second branch 336*a*, the second branch 336*b*, the second branch 336*c* are integrally formed with the second sheet-like resonant body 332, and the lengths of the first branch 326*a*, the first branch 326*b*, the first branch 326*c*, the second branch 336*a*, the second branch 336*b* and the second branch 336*c* are a quarter wavelength of the resonant frequency of the cavity filter 300, the cavity filter 300** has the function of suppressing remote harmonics.

The shapes and structures of the input resonator 320, the output resonator 330 and the intermediate resonator 370 can be designed according to the requirements of the actual resonant frequency.

In one embodiment, the input resonator 320 and the output resonator 330 are arranged at intervals along the first direction F. The intermediate resonator 370 is spaced apart from the input resonator 320 and the output resonator 330 along the second direction S perpendicular to the first direction F, and is located between the input resonator 320 and the output resonator 330 in the first direction F. In other words, in the second direction S, the intermediate resonator 370 partially overlaps with the input resonator 320 or the output resonator 330. Accordingly, coupling may be generated between the output resonator 330 and the intermediate resonator 370 and between the input resonator 320 and the intermediate resonator 370.

In one embodiment, the cavity filter 300 further includes an isolation plate 340, which is located in the accommodating cavity 312 and divides the accommodating cavity 312 into a first cavity **312*a*, a second cavity 312*b* and a third cavity 312*c*. The input resonator 320 is located in the first cavity 312*a*, the output resonator 330 is located in the second cavity 312*b*, and the intermediate resonator 370 is located in the third cavity 312*c***.

In one embodiment, the cavity filter 300 may also include an input device 350 and an output device 360. The input device 350 and the output device 360 connects with the input through-hole 314 and the output through-hole 316 of the housing 310 respectively. The input end 324 extends out of the housing 310 after passing through the input device 350. The output end 334 extends out of the housing 310 after passing through the output device 360.

Figure 18:
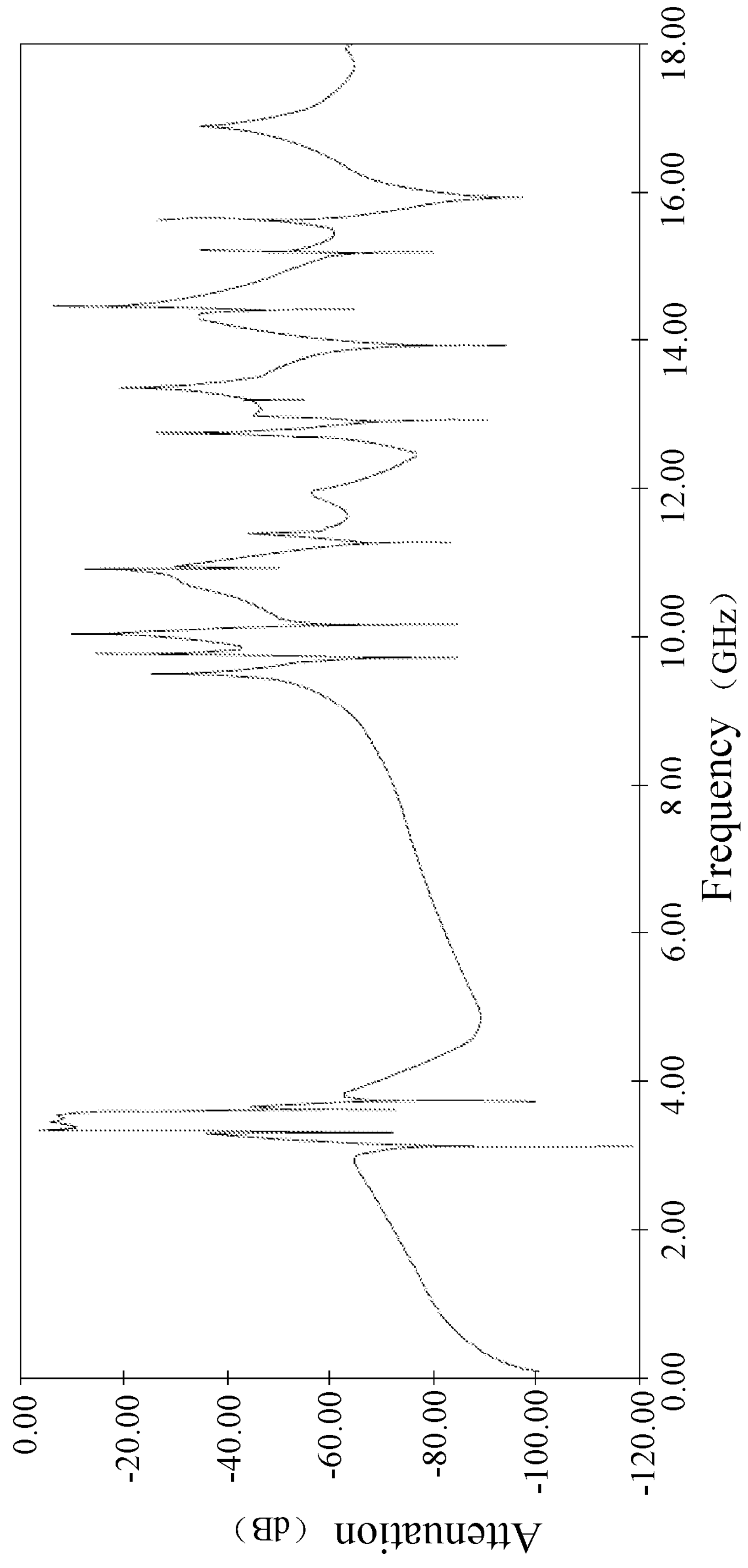
FIG. 18 is the S-parameter simulation graph when the cavity filter of FIG. 1 does not have the first branch and the second branch.
Figure 19:
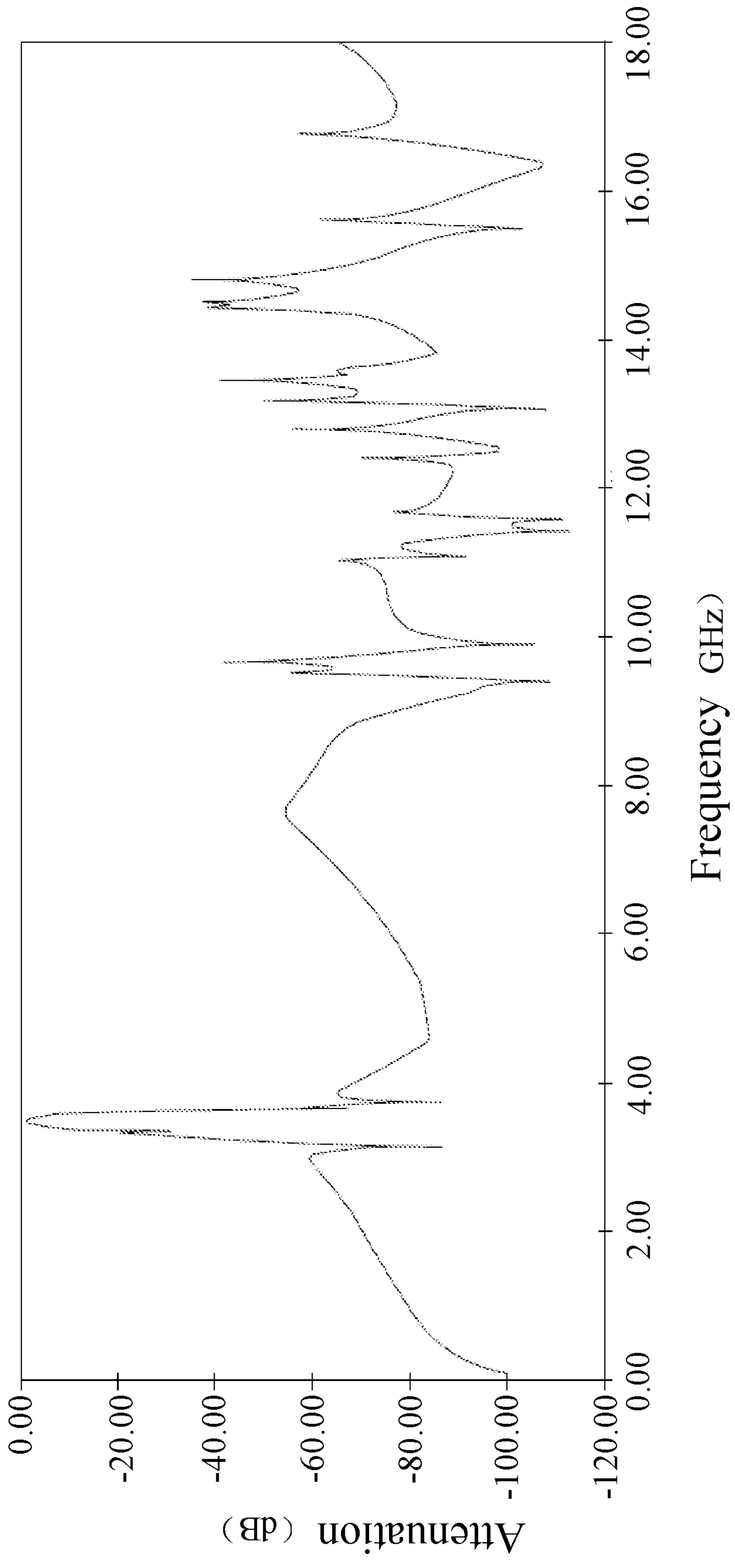
FIG. 19 is an S-parameter simulation graph of the cavity filter of FIG. 1.

Refer to FIG. 18 and FIG. 19. FIG. 18 is the S-parameter simulation graph when the cavity filter of FIG. 1 does not have the first branch and the second branch; and FIG. 19 is an S-parameter simulation graph of the cavity filter of FIG. 1. In FIG. 18 and FIG. 19, the abscissa represents the frequency in gigahertz (GHz), and the ordinate represents the attenuation range in decibel (dB). It can be seen from FIG. 18 and FIG. 19 that in the far-end frequency range (9 GHz to 18 GHz), the cavity filter in FIG. 1 without the first branch 126 and the second branch 136 has significantly greater attenuation at the frequency of 0.028 GHz, 10.920 GHz and 14.456 GHz with poor remote suppression than the cavity filter 100 in FIG. 1 at the frequency of 9.664 GHz, 13.448 GHz and 14.808 GHz with poor remote suppression. Therefore, it can be seen that the cavity filter 100 having the first branch 126 and the second branch 136 has the function of suppressing the remote harmonics.

In summary, through the configuration of the first branch of the input resonator and the second branch of the output resonator, and the length of the first branch and the second branch are a quarter wavelength of the resonant frequency of the cavity filter, the cavity filter 300 has the function of suppressing remote harmonics. The cavity filter has a simple structure and does not use a low-pass filter, so that the material cost is reduced, the manufacturing process is simple, the cost is low, and the performance stability and consistency are good. Therefore, it can meet the needs of miniaturization and light weight.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A cavity filter, comprising:

a housing with an accommodating cavity, an input through hole and an output through hole, the input through hole and the output through hole communicating with the accommodating cavity;

an input resonator located in the accommodating cavity and disposed on the housing, the input resonator comprising a first sheet resonant body, an input end and a first branch, the input end extending outward from one side of the first sheet resonance body, the first branch extending outward from a same side of the input end on the first sheet resonant body and/or the first branch extending outward from the input end, the input end extending out of the housing through the input through hole; and an output resonator located in the accommodating cavity and disposed on the housing, the output resonator comprising a second sheet resonant body, an output end and a second branch, the output end extending outward from one side of the second sheet resonance body, the second branch extending outward from a same side of the output end on the second sheet resonant body and/or the second branch extending outward from the output end, the output end extending out of the housing through the output through hole;

wherein a length of the first branch and a length of the second branch are a quarter wavelength of a resonant frequency of the cavity filter.

2. The cavity filter according to claim 1, wherein the input resonator and the output resonator are sheets with metallic surfaces or are metal sheets.

3. The cavity filter according to claim 1, further comprising an isolation plate disposed in the accommodating cavity and separating the input resonator and the output resonator, the isolation plate including at least one notch.

4. The cavity filter according to claim 1, further comprising an input device and an output device; wherein the input device and the output device connect with the input through hole and the output through hole of the housing respectively; the input end extends out of the input device after passing through the input device; the output end extends out of the housing after passing through the output device.

5. The cavity filter according to claim 1, further comprising an intermediate resonator located in the accommodating cavity and disposed on the housing; wherein a coupling is generated between any two of the input resonator, the output resonator and the intermediate resonator.

6. The cavity filter according to claim 5, further comprising an isolation plate located in the accommodating cavity and dividing the accommodating cavity into a first cavity, a second cavity and a third cavity; wherein the input resonator is located in the first cavity, the output resonator is located in the second cavity, and the intermediate resonator is located in the third cavity.

7. The cavity filter according to claim 5, wherein the input resonator and the output resonator are spaced apart along a first direction; the intermediate resonator is spaced apart from the input resonator and the output resonator along a second direction perpendicular to the first direction; the intermediate resonator is between the input resonator and the output resonator along the first direction.

8. The cavity filter according to claim 1, wherein the number of the first branch is multiple, and the number of the second branch is multiple.

9. The cavity filter according to claim 1, wherein the housing further comprises a bottom plate, a side wall and a cover plate; the side wall is circumferentially connected to the bottom plate; the side wall and the bottom plate form the accommodating cavity and an opening; one side of the cover plate covers and is fixed to the opening; the input resonator and the output resonator are disposed on the bottom plate; the input through hole and the output through hole are arranged on the bottom plate or the side wall.

10. The cavity filter according to claim 1, wherein:

the first branch comprises a first extension section extending outward from one side of the first sheet resonant body, or comprises a second extension section extending outward from the input end and a third extension section extending from one end of the second extension section away from the input end;

the second branch comprise a fourth extension extending outward from one side of the second sheet resonant body, or comprises a fifth extension section extending outward from the output end and a sixth extension section extending from one end of the fifth extension section away from the output end.

11. The cavity filter according to claim 10, wherein the first sheet resonant body and the second sheet resonant body respectively comprise a plurality of resonant rods; each of the resonant rod comprises an upright section and an extension section; the extension section extends outward from one side of the upright sections; the input end and the output end respectively extend outward from another sides of the upright sections of the first sheet resonant body and the second sheet resonant body relative to the extension sections; the first extension section extends outward from one side of the upright section of the first sheet resonator body and/or the second extension section extends outward from the input end; the fourth extension section extends outward from one side of the upright section of the second sheet resonator body and/or the fifth extension section extends outward from the output end.

12. The cavity filter according to claim 1, wherein the first sheet resonant body and the second sheet resonant body respectively comprise a plurality of resonant rods and one or more than one joint rods; the joint rod or the more than one joint rods connect two adjacent resonant rods among the plurality of resonant rods.

13. The cavity filter according to claim 12, wherein each of the plurality of resonant rods comprises an upright section disposed to the housing;

in the input resonator, the input end and the first branch extend outward from one side of the upright section of the outermost resonant rod among the plurality of resonant rods;

in the output resonator, the output end and the second branch extend outward from one side of the upright section of the outermost resonant rod among the plurality of resonant rods.

* * * * *